No. 801,884. PATENTED OCT. 17, 1905.
L. G. KUNZE & J. H. KEELEY.
FISHING ROD.
APPLICATION FILED NOV. 12, 1904.
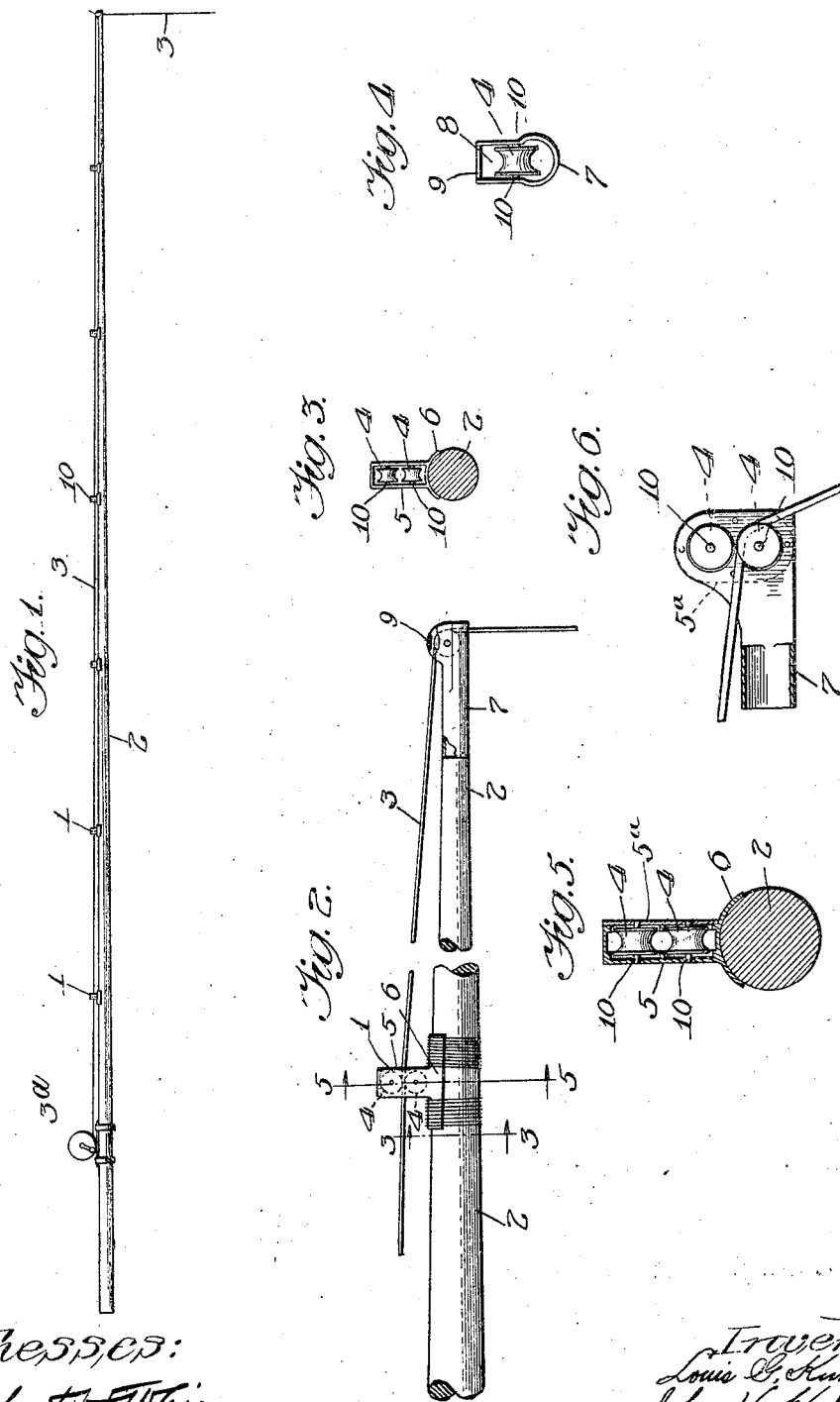

UNITED STATES PATENT OFFICE.

LOUIS G. KUNZE AND JOHN H. KEELEY, OF CHICAGO, ILLINOIS.

FISHING-ROD.

No. 801,884.　　　Specification of Letters Patent.　　　Patented Oct. 17, 1905.

Application filed November 12, 1904. Serial No. 232,398.

*To all whom it may concern:*

Be it known that we, LOUIS G. KUNZE and JOHN H. KEELEY, citizens of the United States of America, residing at Chicago, county of Cook, and State of Illinois, have jointly invented certain new and useful Improvements in Fishing-Rods, of which the following is a description.

Our invention relates to means for supporting and guiding the line to the reel upon a fishing-rod, whereby the friction of the line passing through the loops is practically eliminated.

The object of our invention is to provide a cheap and effective device of the kind described to reduce the friction, and thus greatly lengthen the life of the line and add to the ease and convenience of operating the reel; and to this end our improvement consists in the novel construction, arrangement, and combination of parts hereinafter shown and described, and more particularly pointed out in the claims.

In the accompanying drawings, wherein like or similar reference characters indicate like or corresponding parts, Figure 1 is a view of a fishing-rod equipped with our device. Fig. 2 is an enlarged view showing a loop in position and the arrangement at the tip of the rod. Fig. 3 is a section taken substantially on line 3 3 of Fig. 2. Fig. 4 is an enlarged end view of the rod-tip shown in Fig. 2. Fig. 5 is an enlarged section, taken substantially on line 5 5 of Fig. 2, showing a slight modification. Fig. 6 is a longitudinal section showing a modified form of tip.

In the preferred form of our device shown in the drawings, 1 1 are loops or line-guides arranged upon a fishing-rod 2 in the usual or any preferred manner to guide the line 3 along the rod when drawn in or given out from the reel $3^a$ near the handle of the rod. As shown, each loop 1 consists of a housing 5 of any preferred form, arranged to carry the grooved rollers or sheaves 4 4, as shown, and having a base 6 suitably formed for attachment to the rod 2 in the usual or any preferred manner. The housings 5 may be formed in any suitable manner. As shown in Fig. 3, the sides are straight and flat and spaced from each other a sufficient distance to receive the sheaves 4 between them, while in the form shown in Fig. 5 the sides of the housings are spaced from each other a distance less than the width of the sheaves 4, each of the sides being suitably recessed to allow sufficient play to insure free rotation of the sheaves. By this arrangement the line is guided by the sides to the central portion of the groove in the sheave and prevented from becoming wedged between the side of the housing and the sheaves.

The loop 7 at the tip of the rod is arranged to support and guide the line at this point and may be attached to the rod in any preferred manner. As shown, a tubular part is formed upon the loop 7, into which the end of the rod is fitted and prevented from movement therein by any suitable means. The loop 7 may be provided with any preferred number or arrangement of rollers 4 to guide the line and prevent its detachment from the tip of the rod.

As shown in Figs. 2 and 4, a single sheave 4 is positioned in a slot 8 in the end of the loop 7 and a part 9 formed to extend across the slot outside the sheave. In this form it is evident that as the line passes between the part 9 and the sheave it cannot become detached from the end of the rod.

In the form shown in Fig. 6 the tip 7 is provided with two sheaves set in the slot 8, arranged for the line to pass between them to secure the result previously described.

In Figs. 5 and 6 recesses for inclosing the sides of the sheaves are shown at one side of the housing as openings extending through the side to permit of conveniently placing the sheaves 4 in position in the housing. A cap $5^a$ is provided to fit against and attach to the side 5 to cover said openings and provided with bearings to support the ends of the shaft 10.

It is also obvious that it is immaterial whether the sheaves 4 are loosely mounted upon the shafts 10, rigidly fixed in the housings 5, or whether the sheaves are fixed upon the shafts 10, which are arranged to turn in suitable bearings in the housings, as the operation in either case is substantially the same.

Having thus described our improvement, it is obvious that various immaterial modifications may be made in our device without departing from the spirit of our invention. Hence we do not wish to be understood as limiting ourselves to the exact form or construction shown.

What we claim as new, and desire to secure by Letters Patent, is—

1. In a device of the kind described, a line-guide comprising the combination of a housing provided with a recess upon the inner face of one of its sides and a corresponding opening through its opposite side, a plate adapted to fit upon, and attach to, the side of said housing and extended across and cover said opening, a sheave rotatably supported by said housing and partly inclosed by said recess and said opening, and means for attaching said housing to a fishing-rod.

2. In a device of the kind described, a line-guide comprising the combination of a housing having a plurality of recesses formed upon the inner face of one of its sides, and corresponding openings formed through its opposite side, a removable plate adapted to fit upon, and attach to, the side of said housing and extend across and cover said openings, a plurality of sheaves rotatably supported in said housing and partly inclosed by said recesses and said openings, and means for attaching said housing to a fishing-rod.

In testimony whereof we have hereunto signed our names in the presence of two subscribing witnesses.

LOUIS G. KUNZE.
JOHN H. KEELEY.

Witnesses:
BURTON U. HILLS,
CHARLES I COBB.